Aug. 15, 1944.   G. ROBERTS, JR   2,355,753
CATALYTIC APPARATUS
Filed March 20, 1940   2 Sheets-Sheet 2
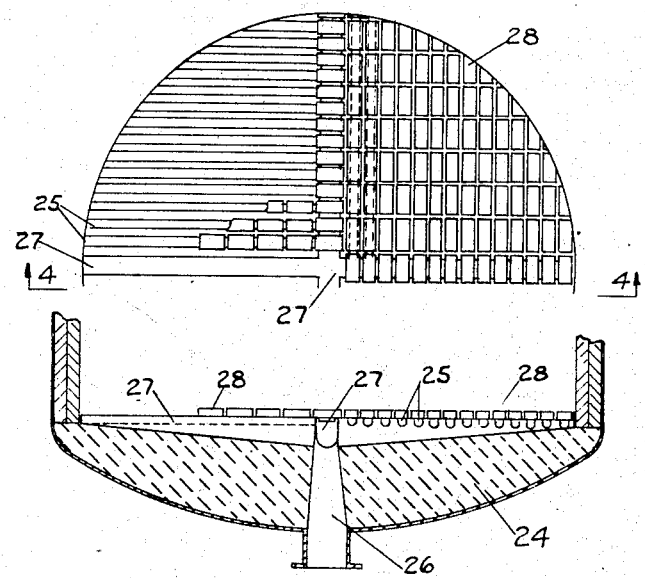
FIG. 3
FIG. 4
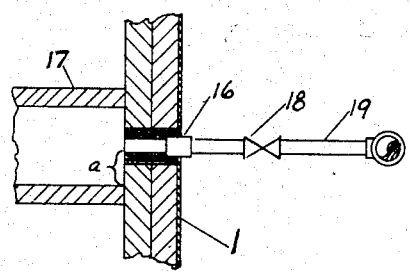
FIG. 5
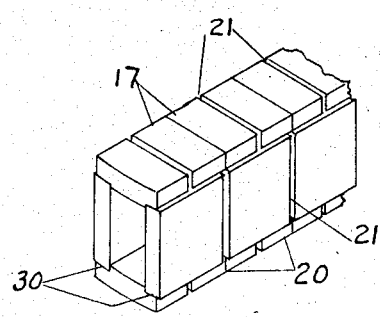
FIG. 6
George Roberts Jr.
INVENTOR
BY E. F. Liebrecht
W. H. Borcherding
ATTORNEY Patented Aug. 15, 1944

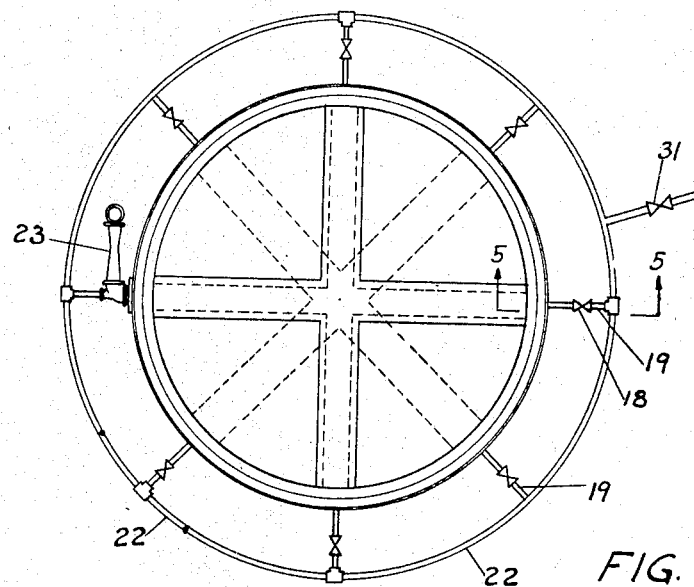
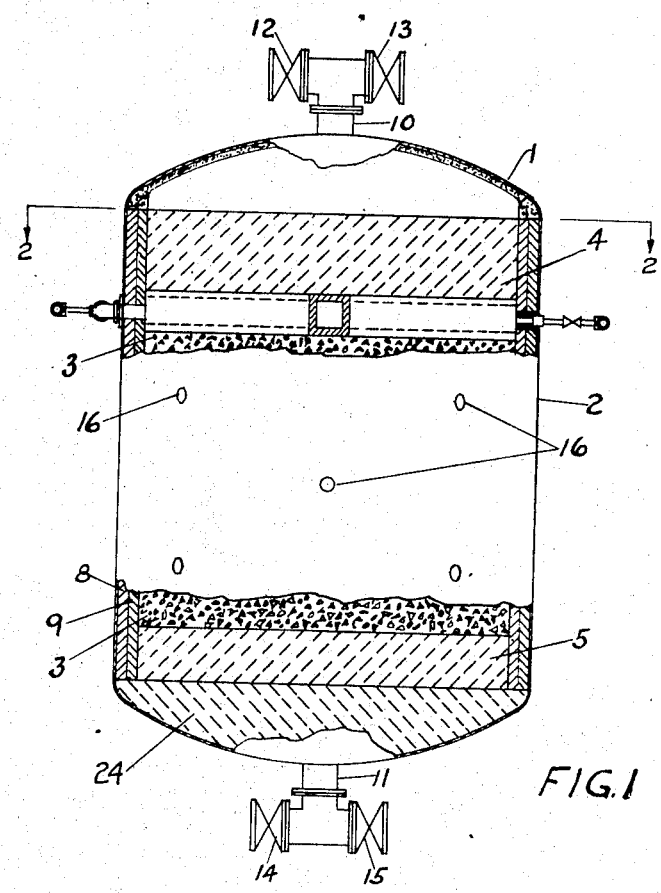

2,355,753

UNITED STATES PATENT OFFICE 2,355,753

CATALYTIC APPARATUS

George Roberts, Jr., Montclair, N. J., assignor to The M. W. Kellogg Company, Jersey City, N. J., a corporation of Delaware Application March 20, 1940, Serial No. 324,899

4 Claims. (Cl. 23—288)

The present invention relates generally to improvements in apparatus for effecting catalytic reactions. More particularly, the invention is concerned with an improved apparatus for carrying out reactions involving the contacting of reactants in the vapor phase with a solid porous contact agent or catalytic material under conditions wherein the desired conversion reaction is attended by the absorption of heat, that is, reactions of an endothermic character.

My invention is especially well exemplified in its application to the production of a synthesis gas adapted for use in the synthesis of various organic compounds, as for example, the production of a mixture of carbon monoxide and hydrogen for use in the production of hydrocarbons in accordance with the Fischer-Tropsch synthesis reaction. A synthesis gas suitable for use in this reaction may be prepared by the interaction of methane with carbon dioxide, or with steam, or with a mixture of carbon dioxide and steam, in accordance with the following equations:

(1) $CH_4 + CO_2 \rightarrow 2CO + 2H_2 - X$ Calories
(2) $CH_4 + H_2O \rightarrow CO + 3H_2 - Y$ Calories
(3) $3CH_4 + CO_2 + 2H_2O \rightarrow 4CO + 8H_2 - Z$ Calories In the production of a synthesis gas for use in accordance with the Fischer-Tropsch synthesis, a process in accordance with reaction (3) generally is preferred since it provides a gas mixture having a ratio of carbon monoxide to hydrogen of 1:2 which constitutes the stoichiometrically required proportions for this synthesis. All the above reactions are endothermic as indicated, and also require the maintenance of an elevated temperature of the order of 2500° to 1500° F. and preferably about 1800° to 2200° F. to enable them to proceed at a satisfactory rate. Various known types of catalytic material may be employed for this reaction, as for example, nickel deposited on clays of high alumina content such as fire clay or Alundum.

One of the principal problems arising in connection with the endothermic reactions of the above type is the provision of satisfactory means for supplying the heat required during the reaction. It has been proposed, heretofore, to carry out such reactions in a combined reactor and heat regenerative system comprising a chamber containing a solid granular contact agent. In operating this system the necessary heat of reaction is supplied by alternately heating the contact agent by burning a combustible gas in contact therewith until it is heated to the temperature required for the conversion, then passing the gases undergoing conversion thereover until the heated contact agent is cooled to the lowest temperature permissible for the conversion reaction and continuously repeating these alternating heat regenerative and conversion cycles.

In connection with a combined reactor and heat regenerator of this type, considerable difficulties have been encountered in the provision of suitable means for heating the contact mass to a suitable temperature without the production of excessively high temperatures in certain parts of the mass. It has been proposed for example to produce a substantially even flame temperature throughout the contact mass during the regenerative cycle by supporting the catalyst in the reactor chamber on a series of horizontal perforated arches extending across and secured to the walls of the chamber. A space free of solids is left below each of the arches into which a portion of the total gaseous fuel required may be introduced. In this arrangement a portion of the fuel gas is introduced into each of the spaces left below the perforated arches from whence it passes downwardly into the adjacent supported catalyst mass and through the perforations into the next lower space, thereby securing a relatively uniform flame temperature. This type of construction is subject to serious structural disadvantages arising out of the alternate expansion and contraction of the elements of the structure due to the wide range of temperature involved during the alternating conversion and heat regenerative cycles. In addition failure of one of the upper arches immediately places its load on the next lower arch and consequently increases the possibility for failure of the lower arch. Further disadvantages of this type of construction are its relatively high cost and inaccessibility of its interior for repairs, change of catalyst, and the like.

The primary object of my invention is the provision of a combination of reactor and heat regenerator wherein these disadvantages are obviated and one which is relatively inexpensive both to construct and operate. Various additional specific objects and advantages of my invention will be apparent from the following detailed description thereof given with reference to the appended drawings wherein;

Figure 1 is a side elevational view of the catalyst chamber, certain portions being shown in sections;

Figure 2 is a plan view of the chamber taken along line 2—2 showing the internal arrangement of burner tubes and including two of the manifolds for supplying fuel gas to the tubes;

Figure 3 is a plan view of the gas distributing means in the lower portion of the chamber;

Figure 4 is a side sectional view taken along line 4—4 and including fragmentary sections of the side walls of the chamber;

Figure 5 is a sectional view taken along line 5—5 of Figure 2 and illustrates the burner tube arrangement relative to the fuel gas inlet; and Figure 6 is an isometric view illustrating the details of a preferred form of burner tube or conduit.

Catalyst chamber 1 comprises a closed cylindrical metallic shell 2 having a bed of a suitable catalytic material 3 disposed in the interior thereof in the form of substantially uniformly sized loose aggregates, as for example, nickel supported on crushed fire brick of one-half to an inch in longest dimension. Layers 4 and 5 consisting of a refractory aggregate, such as crushed fire brick preferably of somewhat coarser mesh than material 3, are provided respectively above and below bed 3. The intermediate portion of shell 2 surrounding the catalyst mass and refractory layers is preferably lined with a refractory facing 8 and an intermediate layer of heat insulating material 9.

Pipes or flues 10 and 11 are provided, respectively, at the top and bottom of chamber 1 for introducing and withdrawing gaseous reactants to the chamber. Pipe 10 is provided with valve 12 through which air may be introduced into the chamber and valve 13 through which conversion products may be withdrawn. Pipe 11 is provided with valve 14 for the introduction of the reactants undergoing conversion and valve 15 for withdrawing combustion gas.

Openings 16 are provided in chamber 1 leading into the catalyst mass 3 for the purpose of introducing a gaseous fuel thereto during the heat regenerative cycle. Each of said openings 16 is disposed adjacent the end of a conduit or burner tube 17 so that fuel gas introduced through valve 18 in fuel gas inlet pipe 19 flows through opening 16 and into the interior of conduit 17 as is best shown in Figure 5. Burner tube 17 may suitably be constructed as shown in Figure 6 of a rectangular tubular shape from refractory tile or brick units 20, assembled so as to leave suitable perforations, apertures, or slots 21 for the discharge of fuel gas from the interior of the tube into the catalytic mass. Burner tubes 17 are imbedded in the catalytic mass and are non-rigidly associated with the side wall of the chamber so that they are capable of limited movement independent of movement of the side wall without interruption of the flow of gas from opening 16 into the interior of the conduit. As shown in Figure 5, the end of tube 17 is in a slidable relationship with the side wall of chamber 1 and may shift a distance equal to $a$ without any interruption of the flow of gas through opening 16. The end of conduits 17 may be associated with the side wall of the conduits by other types of non-rigid connections, if desired, such as ball and socket connections. However, the construction shown is preferred. In order that substantially all of the gas flows into the interior of conduit or tube 17, the end of the conduit may be curved slightly as shown in Figure 6 to provide a snug fit with the circular side wall of the chamber.

The above described construction has the advantage of permitting conduits 17 to shift independently of the contraction and expansion occurring in the side walls due to temperature fluctuations and also has the further advantage of being readily accessible both for installation and repair purposes. Each horizontal set of conduits is readily installed by building the catalyst mass to the required level below openings 16, leveling the surface of the bed and then placing the conduits in position as shown relative to openings 16. Since the tubes are imbedded and supported on all sides by the catalyst aggregate the structural strain to which the tubes are subjected is greatly reduced compared with supported arch structures. The tiles forming the tube are formed with suitable recesses 30 to prevent them from collapsing inwardly.

A plurality of conduits 17 are ordinarily required and are preferably disposed radially in each horizontal set and in an offset relationship vertically as best shown in Figure 2. The conduits are thus disposed in regularly spaced planes both horizontally and vertically and are employed in sufficient number to provide a substantially uniform distribution of the fuel gas throughout the catalytic material during the heat regenerative cycle.

Fuel gas inlet pipes 19 are connected to a manifold pipe 22, one such manifold being used for each horizontal set of burner tubes as shown in Figure 2. Gas is supplied to manifolds 22 through a main valve 31, the individual valves 18 being normally hand operated and used to adjust the relative amount of gas flowing to an individual tube. One of the gas inlet pipes leading from the top manifold is associated with a pilot burner 23.

Suitable means are provided in the lower part of chamber 1 for introducing reactant gases, preferably constructed as shown in Figures 3 and 4. Distributor head 24 may be formed of any suitable refractory material, as for example a cast refractory concrete. The upper face of distributor head 24 is provided with a multiplicity of shallow horizontally extending channels 25 cut or molded therein through which reactant gases may be distributed throughout the area underlying the mass of aggregate in the chamber. The gas is introduced to these channels through a main vertically extending passageway 26 connected to pipe 11 and then through a pair of intersecting horizontally extending passageways 27, which decrease in depth from the point of their intersection with vertical passageway 26 to their periphery, and function as gas feeders or manifolds for the shallow distributing channels 25. Tile or brick 28 are disposed over channels 25 in a spaced relationship so as to leave suitable openings between the tile through which gas passes from channels 25 into the overlying mass of aggregate.

The operation of the device may be illustrated by its application to the manufacture of a synthesis gas mixture containing a 2:1 ratio of hydrogen to carbon monoxide, from a mixture of methane, carbon dioxide and steam according to the following equation:

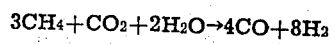

$$3CH_4 + CO_2 + 2H_2O \rightarrow 4CO + 8H_2$$

In this operation the regenerator may be suitably operated at a superatmospheric pressure both in the heat regenerative or "blast" cycle and also in the conversion or "make" cycle. A pressure, for example, of about 7½ lbs. square inch gauge is suitable for use during the heat regenerative cycle and a pressure of about 25 lbs. square inch gauge during the conversion cycle. The temperature variation of the catalyst bed in the process is preferably maintained within the range of about 2200° F. to 1800° F. The total time taken for both cycles is subject to variation, a typical run requiring 3½ minutes on "blast" and 3½ minutes on the "make" cycle.

In starting the operation the pilot burner 23 is lighted to guard against any possible explosion. Air is introduced through pipe 10 by opening valve 12 and in quantity somewhat in excess, for example about 15%, of the amount required to support combustion of the fuel gas introduced through valves 18 in the inlet pipes 19 by opening main valve 31. The combustion gases leave the bottom of the regenerator through pipe 11 and pass through valve 15 to a stack. When the catalyst and refractory layers 3, 4 and 5 are heated to the required temperature the fuel and air supply are cut off by closing main valve 31 and air valve 12 and then the gas reactants for example methane, carbon dioxide and steam, in the required proportions are introduced at the bottom of the regenerator through valve 14 and by the gas distributing means in the lower part of the chamber throughout the mass of aggregate. In passing through the lower mass of hot refractory material 5 they are preheated and then pass through the catalytic mass 3 wherein the desired reaction occurs, and next pass through the upper layer 4 of crushed refractory aggregate wherein they give up a large proportion of their sensible heat to the material of this layer. When the temperature of the catalyst mass has fallen below the minimum temperature required for the conversion, for example about 1800° F., the flow of reactants is stopped and the regenerator again put on the heat regenerative or blast cycle. After the blast cycle a short steam purge may be used, if desired, in order to keep the inerts in the synthesis gas to a minimum.

From the foregoing it will be apparent that I have accomplished the objects of my invention in providing an improved type of apparatus for carrying out endothermic reactions such as the manufacture of synthesis gas. It will be evident to those skilled in the art that various modifications may be made in the construction described, which is exemplary only, without departing from the essential features of my invention, and the scope of the invention is not restricted except as required by the appended claims.

I claim:

1. An apparatus for carrying out endothermic reactions involving contacting gaseous reactants with a porous catalytic material at elevated temperatures and adapted to operate on alternating conversion and heat regenerative cycles, which comprises a chamber having a contact mass in loose aggregate form disposed in the interior thereof and openings in the side wall of said chamber for introducing a fuel gas thereto, conduits imbedded in and supported by said mass in substantially horizontal planes and having apertures at suitably spaced intervals throughout their length for the introduction of the fuel gas into said mass, the ends of said conduits being abutted against the side walls of the chamber and arranged in fluid-intercommunicating relationship with said wall openings and being non-rigidly and slidably associated with the wall of the chamber whereby said conduits are capable of limited movement relative to said wall without interruption of the flow of fuel gas through the conduits.

2. An apparatus for carrying out endothermic reactions involving contacting gaseous reactants with a porous catalytic material at elevated temperatures and adapted to operate on alternating conversion and heat regenerative cycles causing alternating contraction and expansion of the catalytic material and in the structural elements of the apparatus, which comprises a catalyst chamber having a catalytic mass in loose aggregate form disposed in the interior thereof and openings in the side wall of said chamber for introducing a fuel gas thereto, conduits imbedded in and supported by said catalytic mass and having apertures at suitably spaced intervals throughout their length for the introduction of the fuel gas into said mass, the ends of said conduits being abutted against the side walls of the chamber and arranged in fluid-intercommunicating relationship with said wall openings and being non-rigidly and slidably associated with the wall of the chamber whereby said conduits are capable of limited movement relative to said wall at least equal to that caused by said expansion and contraction and without interruption of the flow of fuel gas through the conduits.

3. A regenerator and catalytic chamber adapted to be operated alternately on an endothermic conversion cycle and a heat-regenerative cycle comprising an insulated ceramic shell, a mass of catalytic material in loose aggregate form disposed in said shell, a layer of refractory material arranged above and below said catalytic material, flues connected to the upper and lower portions of the shell for introducing and exhausting gas to be converted by the endothermic reaction, said shell having openings in the side wall thereof for introducing gaseous fuel at a plurality of points directly into the catalytic material, conduits imbedded in and supported by said catalyst mass and having apertures at suitably spaced intervals throughout their length for the introduction of the fuel gas throughout said catalyst mass, the ends of said conduits being abutted against the side walls of the chamber and arranged in fluid-intercommunicating relationship with said wall openings and non-rigidly and slidably connected with the wall of the chamber whereby said conduits are capable of limited movement relative to said wall without interruption of the flow of fuel gas through the conduit.

4. An apparatus for carrying out reactions involving contacting gaseous reactants with a porous catalytic material over a wide temperature range causing alternating contraction and expansion in the catalytic material and in the structural elements thereof, which comprises a catalyst chamber having a catalytic mass in loose aggregate form disposed in the interior thereof and openings in the side wall of said chamber for introducing a fuel gas thereto, conduits imbedded in and supported by and distributed throughout said catalytic mass at suitably spaced points both circumferentially and longitudinally and having apertures at suitably spaced intervals throughout their length for the introduction of the fuel gas into said mass, the ends of said conduits being abutted against the side walls of the chamber and arranged in fluid-intercommunicating relationship with said wall openings and being non-rigidly and slidably associated with the wall of the chamber whereby said conduits are capable of limited movement relative to said wall at least equal to that caused by said expansion and contraction and without interruption of the flow of the gas through the conduits.

GEORGE ROBERTS, Jr.